G. SCHEIHING.
HAY STACKER.
APPLICATION FILED JUNE 29, 1918.
1,301,178.
Patented Apr. 22, 1919.
3 SHEETS—SHEET 1.
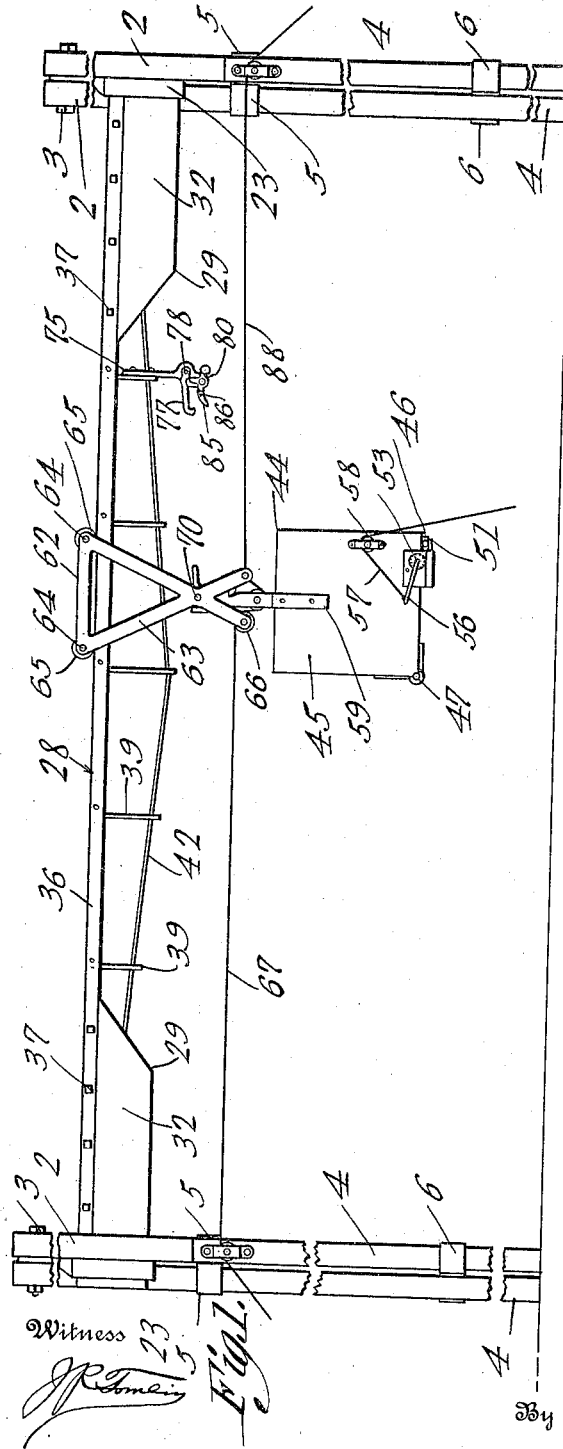
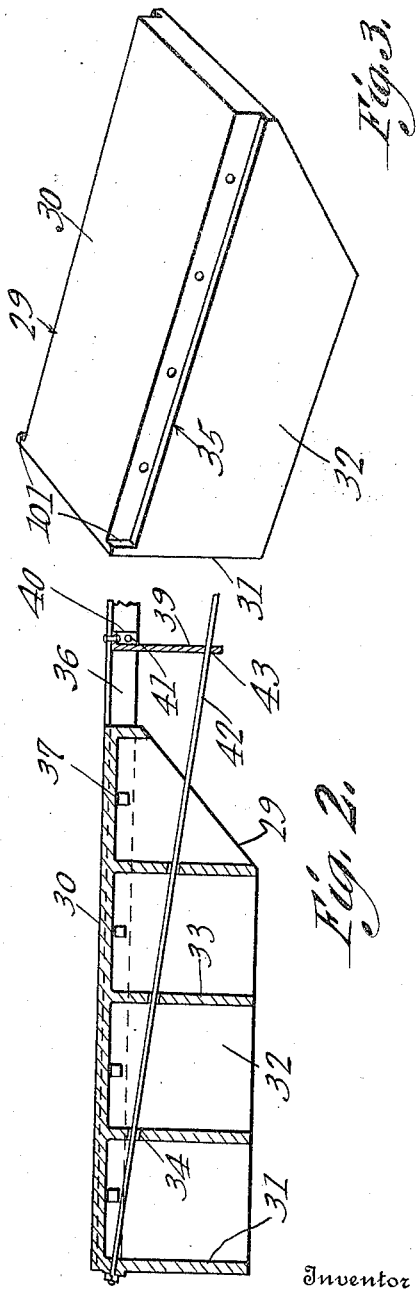
Inventor
G. Scheihing
By
Attorneys

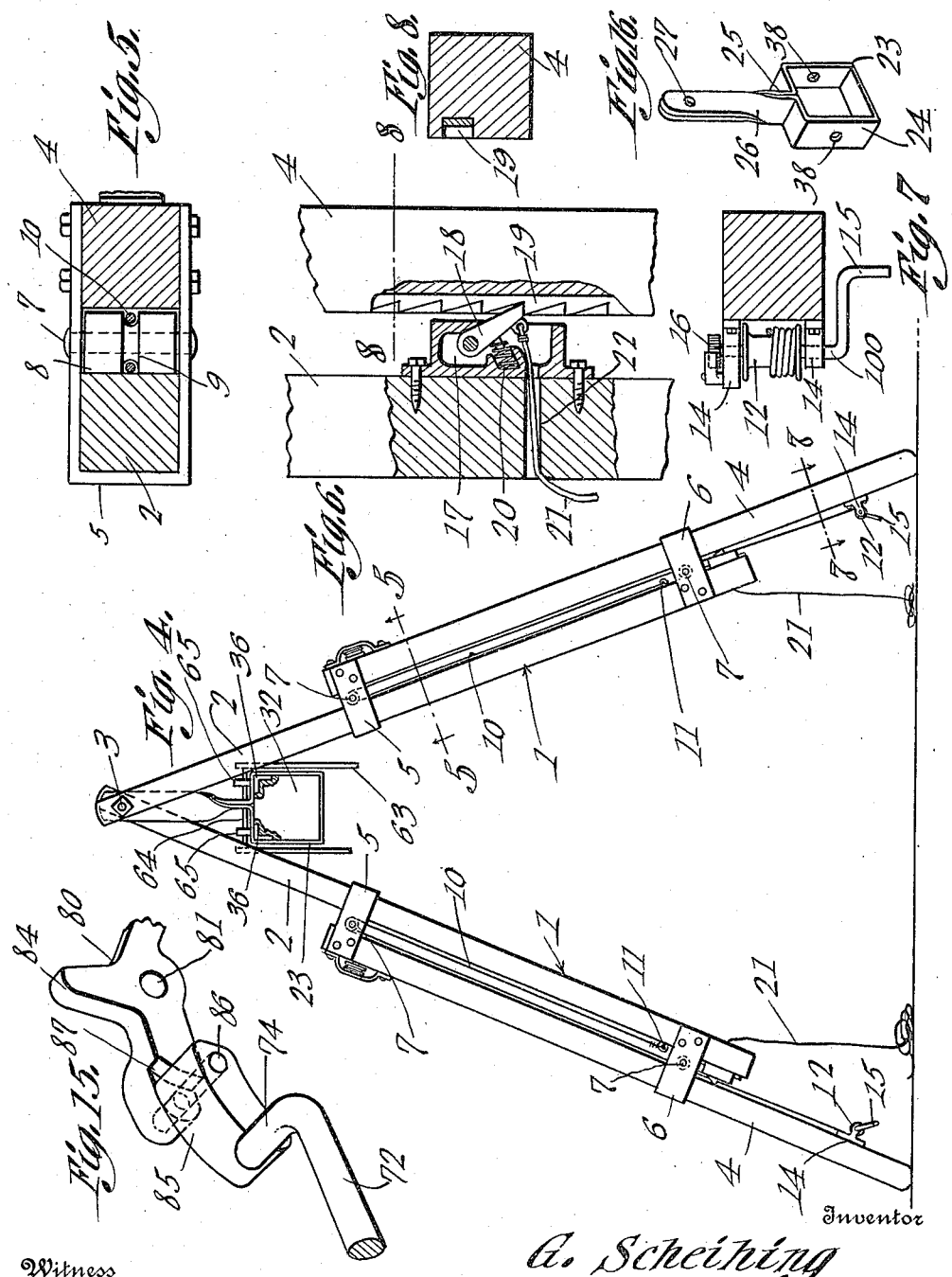

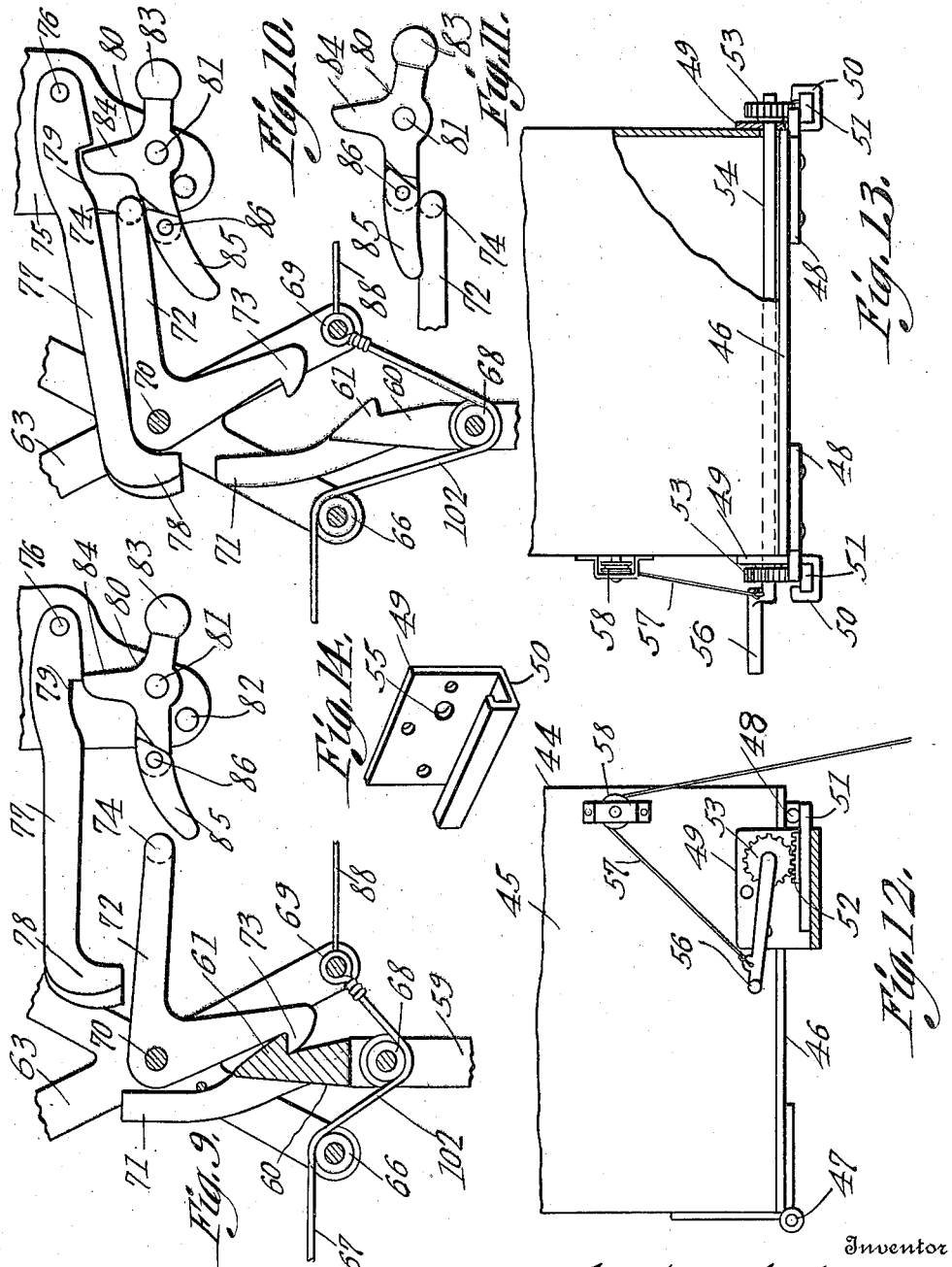

UNITED STATES PATENT OFFICE.

GEORGE SCHEIHING, OF COLUMBUS, NEBRASKA.

HAY-STACKER.

1,301,178.

Specification of Letters Patent. Patented Apr. 22, 1919.

Application filed June 29, 1918. Serial No. 242,597.

*To all whom it may concern:*

Be it known that I, GEORGE SCHEIHING, a citizen of the United States, residing at Columbus, in the county of Platte and State of Nebraska, have invented a new and useful Hay-Stacker, of which the following is a specification.

One object of the present invention is to improve the construction of the track along which the carriage moves; another object is to provide means whereby the track may be raised and lowered. A further object of the invention is to improve the construction of the dumping-bucket, if a bucket is used instead of a hay fork. Another object of the invention is to provide means for holding and releasing the carriage when the bucket is raised and lowered.

A mechanic can make changes in the structure shown, without departing from the spirit of the invention.

In the drawings:—Figure 1 shows in side elevation, a device constructed in accordance with the invention; Fig. 2 is a longitudinal section through one end of the track; Fig. 3 is a perspective showing one of the track casings; Fig. 4 is an end elevation of the structure shown in Fig. 1; Fig. 5 is a cross section on the line 5—5 of Fig. 4; Fig. 6 is a detail showing the locking mechanism for the supports; Fig. 7 is a cross section on the line 7—7 of Fig. 4; Fig. 8 is a cross section on the line 8—8 of Fig. 6; Fig. 9 is an elevation showing the means for controlling the carriage; Fig. 10 is a view similar to Fig. 9 but showing the bucket released from the carriage; Fig. 11 is a fragmental elevation showing the relation between certain parts depicted in Figs. 9 and 10; Fig. 12 is a fragmental side elevation of the bucket; Fig. 13 is a fragmental front elevation of the bucket; Fig. 14 is a perspective showing one of the brackets carried by the bucket; Fig. 15 is a perspective view showing the dog and attendant parts.

The invention comprises a pair of supports 1 each including top bars 2 connected by bolts 3, and bottom bars 4. The bars 4 carry U-shaped guides 5 receiving the bars 2 slidably, the bars 2 carrying U-shaped guides 6 receiving the bars 4 slidably. Shafts 7 are mounted in the guides 5 and 6 and carry rollers 8 which, being located between the bars 2 and 4, facilitate the sliding of the bars on each other. The rollers 8 have circumscribing grooves 9. The numeral 10 marks a flexible element having its lower end secured at 11 to the bar 2, the flexible element being extended upwardly and downwardly around the roller 8 in the guide 5 and through the groove 9 in the roller. The flexible element 10 passes downwardly through the groove 9 in the roller 8 of the guide 6 and is connected to a drum 12 carried by a shaft 100 mounted in bearings 14 on the bar 4, the shaft having a crank 15 and being held against reverse rotation by means of a pawl and ratchet mechanism 16.

A casing 17 is secured to the inner edge of the bar 2 and a dog 18 is pivoted in the casing, the dog engaging a rack 19 on the inner edge of the bar 4, under the action of a spring 20. A releasing line 21 is attached to the dog 18 and passes outwardly through an opening 22 in the bar 2. The structures above described are duplicated at the opposite ends of the complete mechanism shown in Fig. 1.

Hangers 23 are provided, each hanger including an open head 24 having side openings 38. The top of the hanger merges into a double walled shank 25 twisted at 26 and provided with an opening 27 receiving the bolt 3, the upper end of the shank being located between the upper ends of the bars 2. The ends of a track 28 are received in the heads 24 of the hangers 23. The track includes end casings 29 each comprising a top 30, an end 31, sides 32 and cross webs 33 uniting the sides, the webs having openings 34. Longitudinal seats 35 are fashioned in the upper edges of the sides 32, the end 31 forming shoulders 101 at the extremities of the seats 35. Angle members 36 are provided, the vertical flanges thereof being received in the seats 35 and abutting against the shoulders 101, the horizontal flanges of the angle members overlapping the top 30 of the end casing 29. Securing elements 27 unite the vertical flanges of the angle members 36 with the end casings 29, certain of these securing elements being received in the openings 38 of the hanger 23, so as to connect the track 28 with each hanger. Cross plates 39 extend between the angle members 36 and reinforce the same, the plates having flanges 40 united by securing elements 41 with the vertical flanges of the angle members, the plates having openings 43. Through the openings 43 of the plates 39 and through the openings 34 in the webs 33 of the end casings 29, is extended a truss rod 42, having its ends connected with the members 31 of the end casings 29.

The structure hereinbefore described may be used with a hay fork, but by way of illustration, it has been delineated as employed with a dumping bucket 44 including a body 45 and a bottom 46 hinged at 47 to the body. Keepers 48 are secured to the bottom 46 near its free edge, the keepers projecting laterally beyond the side walls of the bucket body 45. Brackets 49 are attached to the sides of the body 45 and include guides 50. Latches 51 slide in the guides 50, and coöperate with the ends of the keepers 48. The latches 51 carry racks 52 meshing into pinions 53 on a shaft 54 journaled in openings 55 formed in the brackets 49. The shaft 54 has a crank 56 to which is attached a flexible element 57 rove across a sheave 58 journaled on the body 45 of the bucket 44. A fork 59 is connected to the bucket body 45 and terminates at its upper end in a shank 60 carrying a finger 71 and provided with a beveled hook 61.

The numeral 62 denotes generally a carriage mounted to move along the track 28 and including a pair of X-shaped frames 63 connected at their upper ends by cross shafts 64 carrying rollers 65 coöperating with the angle members 36 of the track 28. A sheave 66 is mounted on the lower end of the carriage 62, and across the sheave is extended a haul-back line 67 formed into a loop 102 engaged around a sheave 68 carried by the shank 59 of the fork which supports the bucket 44, the end of the line 67 being secured at 69 to the carriage 62. The frames 63 of the carriage 62 are connected by a rod 70 on which an angular latch 72 is mounted to swing, one end of the latch having a hook 73 coacting with the hook 61 on the dumping bucket, hay fork or like load carrier. The other end of the latch 72 has a lateral offset 74. A hanger 75 is attached to one of the cross plates 39 of the track 28 or is otherwise supported thereon. A keeper 77 is pivoted at 76, at one end, to the hanger 75 and includes a nose 78 adapted to coöperate with the angle of the latch 72, the keeper having a notch 79 in its lower edge, near to the pivot 76. The numeral 80 marks a dog fulcrumed at 81, between its ends, on the hanger 75. Downward movement of the dog is limited by a stop 82 on the hanger 75. The dog 80 has a counter weighted end 83 and is provided intermediate its ends with an upstanding finger 84 coöperating with the notch 79. A pawl 85 is pivoted to one side of the dog 80, as shown at 86. The dog 80 has a shoulder 87 with which the inner end of the pawl 85 coöperates, the construction being such that the pawl can have a limited vertical movement only, on the pivot 86. The numeral 88 marks a outhaul line connected with the carriage 62.

The flexible elements 10 may be manipulated by means of the drums 12 to raise or lower the top bars 2 and the track 28. The dogs 18 coöperate with the racks 19 to prevent a downward movement of the bars 2 and the track 28. It is possible to disengage the dogs 18 from the racks 19 and to permit a lowering of the track 28, by pulling on the lines 21, the springs 20 restoring the dogs to engagement with the racks, when the pull on the lines is released.

Note Fig. 9. The weighted end 83 of the dog 80 raises the finger 84 and the latter supports the keeper 77. The hook 73 on the latch 72 engages the hook 61 on the shank 60 of the bucket support, and thus the bucket is upheld. The carriage 62 is drawn to the right by the line 88. The offset 74 on the latch 72 rides along the pawl 85 and swings the left hand end of the dog downwardly until the said end engages the stop 82. The latch 72 is tilted on the rod 70 and the hook 73 is disengaged from the hook 61. This permits the bucket 44 to be lowered, when the line 67 is slacked away. When the dog 80 is tilted as aforesaid, the finger 84 enters the notch 79 in the keeper 77, the keeper swinging downwardly, and the nose 78 engaging the angle of the latch 72. Thus, the carriage 62 is held while the load is being lowered. When the latch 72 moves to the right, along with the carriage 62, the offset 74 rides across the inner end of the pawl 85, and can pass beneath the pawl 85, when the carriage is moved to the left, the parts being shown thus arranged in Fig. 11, the pawl having a limited upward swinging movement on its pivot 86. Thus, the hook 73 on the latch 72 is so disposed that it may engage with the hook 61 of the bucket hanger, when the latter is raised.

Suppose that the bucket has been lowered and that the parts are arranged as shown in Fig. 11. When the line 67 is drawn upon, the fork 59 is raised. The finger 71 coacts with the nose 78 and raises the keeper 77, thus setting the carriage 62 free, so that it can be drawn to the left by the line 67. When the keeper 77 is raised as aforesaid, the finger 84 on the dog 80 is disengaged from the notch 79. The finger 71 holds the keeper 77 elevated until the dog 80 has been swung, under the action of the weight 83, into such a position that the finger 84 will support the keeper 77 in the position of Fig. 9, when the carriage 62 and the finger 71 move to the left. When the carriage 62 moves to the right, the bucket is released and may be lowered, the carriage being held until the bucket is raised, and when the bucket is raised, the carriage can move to the left under the action of the line 67.

Having thus described the invention, what is claimed is:—

1. In a device of the class described, a pair of end supports each comprising top bars, bottom bars slidably assembled with the top bars; means for producing relative longitudinal movement between the top and bottom bars; means for holding the top and bottom bars in adjusted positions with respect to each other; connections uniting the top bars adjacent to their upper ends; hangers carried by the connections; a track mounted on the hangers; a carriage movable along the track; and load supporting means assembled with the carriage.

2. In a device of the class described, box-like casings having cross webs; angle members comprising flanges overlapped on the tops of the casings, and flanges engaging the sides of the casings; cross plates connecting the angle members; a truss rod having its ends connected with the casings and extended through the cross webs and through the cross plates; supports assembled with the casings; a carriage mounted to move along the angle members; and load supporting means assembled with the carriage.

In testimony that I claim the foregoing as my own, I have hereto affixed my signature in the presence of two witnesses.

GEORGE SCHEIHING.

Witnesses:
R. M. PARKER,
BENEDICT LAWTON.

Copies of this patent may be obtained for five cents each, by addressing the "Commissioner of Patents, Washington, D. C."